United States Patent
Kenchammana-Hosekote et al.

(10) Patent No.: US 9,842,114 B2
(45) Date of Patent: Dec. 12, 2017

(54) PEER TO PEER NETWORK WRITE DEDUPLICATION

(71) Applicant: NetApp, Inc., Sunnyvale, CA (US)

(72) Inventors: Deepak Raghu Kenchammana-Hosekote, Mountain View, CA (US); Anshul Madan, Brookline, MA (US)

(73) Assignee: NetApp, Inc., Sunnyvale, CA (US)

( * ) Notice: Subject to any disclaimer, the term of this patent is extended or adjusted under 35 U.S.C. 154(b) by 303 days.

(21) Appl. No.: 14/865,869

(22) Filed: Sep. 25, 2015

(65) Prior Publication Data

US 2017/0091183 A1    Mar. 30, 2017

(51) Int. Cl.
G06F 17/00    (2006.01)
G06F 17/30    (2006.01)

(52) U.S. Cl.
CPC .... G06F 17/3015 (2013.01); G06F 17/30194 (2013.01); G06F 17/30867 (2013.01)

(58) Field of Classification Search
CPC ........... G06F 17/3015; G06F 17/30194; G06F 17/30867
USPC ........................................................ 707/692
See application file for complete search history.

(56) References Cited

U.S. PATENT DOCUMENTS

| | | | | |
|---|---|---|---|---|
| 8,099,571 B1 * | 1/2012 | Driscoll | ............. | G06F 11/2066 |
| | | | | 707/655 |
| 8,577,850 B1 * | 11/2013 | Genda | .................. | G06F 3/0641 |
| | | | | 707/692 |
| 8,620,886 B1 | 12/2013 | Madan et al. | | |
| 2008/0005141 A1 * | 1/2008 | Zheng | .................. | G06F 3/0608 |
| 2012/0158670 A1 * | 6/2012 | Sharma | ................. | G06F 3/0608 |
| | | | | 707/692 |
| 2013/0091102 A1 * | 4/2013 | Nayak | .................. | G06F 3/0613 |
| | | | | 707/692 |
| 2013/0097380 A1 * | 4/2013 | Colgrove | .......... | G06F 17/30159 |
| | | | | 711/118 |

(Continued)

OTHER PUBLICATIONS

Chen, Chao, et al., "Data Deduplication in a Hybrid Architecture for Improving Write Performance", ROSS '13, Eugene, OR Jun. 10, 2013, Article No. 10, 8 pages.*

(Continued)

*Primary Examiner* — Robert Stevens
(74) *Attorney, Agent, or Firm* — Cesari and McKenna, LLP (57) ABSTRACT

A technique described herein performs peer to peer network write deduplication. A host system generates a fingerprint for data associated with a write request. The host system may then determine whether the generated fingerprint matches a local fingerprint stored in a local data structure or whether the generated fingerprint matches a global fingerprint associated with a global data structure, wherein the local fingerprint is associated with data previously written to the storage system by the host and wherein the global fingerprint is associated with data previously written to the storage system by a different host. If a match is found, the host system constructs a deduplication command utilizing a logical address corresponding to a storage location that stores the data. If a match is not found, a write command for the data of the write request is constructed and sent to the storage system.

20 Claims, 6 Drawing Sheets

(56) References Cited

U.S. PATENT DOCUMENTS

2013/0297884 A1* 11/2013 Hyde, II ............. G06F 12/0891
711/135
2014/0136789 A1* 5/2014 Madan ................... G06F 17/00
711/133

OTHER PUBLICATIONS

"EMC Data Domain Global Deduplication Array—A Detailed Review", Part No. h7080.2, © 2011 EMC Corporation, pp. 1-24.*
Dong, Wei, "Tradeoff in Scalable Data Routing for Deduplication Clusters" 15 pages.

* cited by examiner

FIG. 6

PEER TO PEER NETWORK WRITE DEDUPLICATION

BACKGROUND

Technical Field

The subject matter herein relates to deduplication of data and, more specifically, to a technique for performing peer to peer network write deduplication.

Background Information

A storage system typically includes one or more storage devices into which data may be entered, and from which data may be obtained, or desired. The data stored on the storage devices may be accessed by a host system using a protocol over a network connecting the storage system to the host system. The storage system may typically retain a plurality of copies of similar data (e.g., duplicate data). Duplication of data may occur when, for example, two or more storage containers, such as files, store common data or where data is stored at multiple locations within a file. The storage of such duplicate data increases the total consumption of storage space utilized by the storage system and may cause administrators to expand a physical storage space available for use by the system, thereby increasing costs to maintain the storage system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The subject matter herein is directed to a technique for performing peer to peer network write deduplication. According to the technique, a host system generates a fingerprint for data of a write request destined to a storage system. The host system may then determine if the generated fingerprint matches a fingerprint maintained at a local data structure stored at the host system. Specifically, the fingerprints stored in the local data structure may be associated with data previously written to the storage system by the host system. If a match is found, indicating that the data associated with the write request is previously stored at the storage system, a deduplication ("dedupe") command may be constructed with a logical address corresponding to a storage location of the data stored at the storage system. For example, the logical address may correspond to a source location on the storage devices of the storage system that stores the data. The dedupe command may then be sent from the host system to the storage system. The dedupe command may instruct, for example, the storage system to increment a reference count associated with the data stored at the logical address of the storage system. Alternatively, the dedupe command may instruct the storage system to copy the data from the source location to a destination location associated with the logical address.

If a match is not found between the generated fingerprint and a fingerprint in the local data structure, the host system may determine if the generated fingerprint matches a fingerprint associated with a global data structure maintained by the host system. The fingerprints associated with the global data structure may be for data previously written to the storage system by other host systems. That is, the host system receives the fingerprints (and potentially other information) from other host systems to populate its global data structure. For example, the global data structure may be (i) a global logical address map that stores fingerprints and logical addresses, (ii) a global ID map that stores fingerprints and identifiers of the other host systems, or (iii) a space-efficient probabilistic data structure, such as a bloom filter. If a match is found, indicating that the data associated with the write request is stored at the storage system, a dedupe command may be created with the logical address corresponding to a storage location of the data stored at the storage system. The dedupe command may then be sent to the storage system.

If a match is not found between the generated fingerprint and the fingerprints in the local data structure or the fingerprints associated with the global data structure, a write command may be constructed and sent to the storage system to write the data to a storage location associated with a (different) logical address. In addition, the generated fingerprint and the particular logical address associated with the storage location may be stored as a new entry in the local data structure of the host system that generated the fingerprint. Further, the fingerprint (and potentially other information such as an identifier of the host system or the particular logical address) may be sent to the other hosts to update their respective global data structures.

DESCRIPTION

Description

Figure 1:
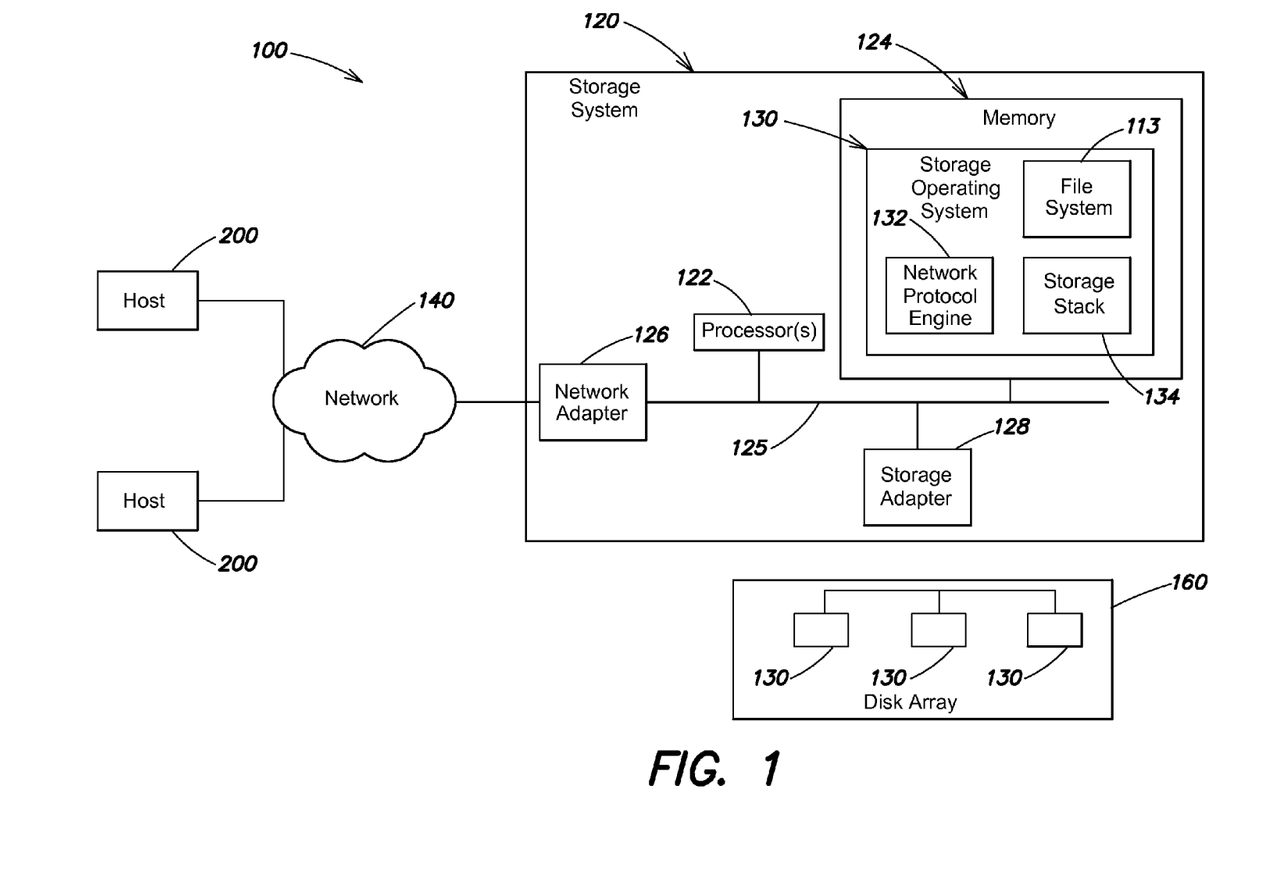
FIG. 1 is a schematic block diagram of storage environment.

FIG. 1 is a schematic block diagram of a storage environment 100 including a storage system 120 that may be advantageously used with the embodiments described herein. The storage system is illustratively a computer that provides storage service relating to the organization of information on storage devices, such as disks 130 of a disk array 160. The storage system 120 includes a processor 122, a memory 124, a network adapter 126, and a storage adapter 128 interconnected by a system bus 125. The storage system 120 also includes a storage operating system 130 that illustratively implements a high-level module, such as a file system, to logically organize the information as a hierarchical structure of named storage containers, such as directories, files, and logical units (LUNS). The storage operating system 130 includes a series of software layers organized to form an integrated network protocol stack 132 or, more generally, a multi-protocol engine that provides data paths for clients to access information stored on the storage system using block and file access protocols. In addition, the storage operating system includes a storage stack 134 that includes storage modules that implement a storage (e.g., RAID) protocol and manage the storage and retrieval of information to and from the volumes/disks in accordance with input/output (I/O) operations.

In an embodiment, the memory 124 includes memory locations that are addressable by the processor 122 and adapters for storing software programs and/or processes and data structures associated with embodiments discussed herein. The processors and adapters may include processing elements and/or logic circuitry configured to execute the software programs/processes and manipulate the data structures. Storage operating system 130, portions of which are typically resident in memory and executed by the processing elements, functionally organizes the storage system 120 by, inter alia, invoking storage operations executed by the storage system. It will be apparent to those skilled in the art that other processing and memory means, including various computer readable media, may be used for storing and executing program instructions pertaining to the embodiments described herein. It is also expressly contemplated that the various software programs, processors and layers described herein may be embodied as modules configured to operate in accordance with the disclosure, e.g., according to the functionality of a software program, process or layer.

The network adapter 126 includes the mechanical, electrical and signaling circuitry needed to connect the storage system 120 to host systems 200 over a computer network 140, which may include one or more point-to-point connections or a shared medium, such as a local area network. Illustratively, the computer network 140 may be embodied as an Ethernet network or a Fibre Channel (FC) network. The host system 200 may communicate with the storage system 120 over computer network 140 by exchanging discrete frames or packets of data according to pre-defined protocols, such as the Transmission Control Protocol/Internet Protocol (TCP/IP).

The storage adapter 128 may cooperate with the storage operating system 130 executing on the storage system 120 to access information requested by a user (or client) operating the host system 200. The information may be stored on any type of attached array of writable storage device media such as video tape, optical, DVD, solid state devices (SSDs), magnetic tape, bubble memory, electronic random access memory, micro-electro mechanical and any other similar media adapted to store information, including data and parity information. However, as illustratively described herein, the information is preferably stored on disks 130, such as hard disk drives (HDDs) and/or direct access storage devices (DASDs), of array 160. The storage adapter 128 includes I/O interface circuitry that couples to the disks 130 over an I/O interconnect arrangement, such as a conventional high-performance, FC serial link topology.

Storage of information on array 160 may be implemented as one or more storage "volumes" that include a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID), managed according to a RAID protocol.

The memory 124 includes a file system 113 that organizes the data and data structures resident on host computer 200. The file system 213 illustratively implements the WAFL file system having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Operationally, a request from the host system 200 is forwarded as one or more packets over the computer network 140 and onto the storage system 120 where it is received at the network adapter 126. A network driver of the protocol stack 132 processes the packet and, if appropriate, passes it on to a network protocol server layer for additional processing prior to forwarding to the file system. Here, the file system 113 generates operations to load (retrieve) the requested data from disk if it is not resident "in core", i.e., in the memory 124. If the information is not in the memory 124, the file system 113 indexes into the inode file using the inode number to access an appropriate entry and retrieve a logical vbn. The file system then passes a message structure including the logical vbn to a storage layer of the storage protocol stack 134; the logical vbn is mapped to a disk identifier and physical block number (disk,pbn) and sent to an appropriate driver (e.g., SCSI) of the storage layer of the storage protocol stack 134. The driver accesses the pbn from the specified disk and loads the requested data block(s) in the memory 124 for processing by the storage system 120. Upon completion of the request, the storage system 120 (and operating system) returns a reply to the host system 200 over the network 140.

Figure 2:
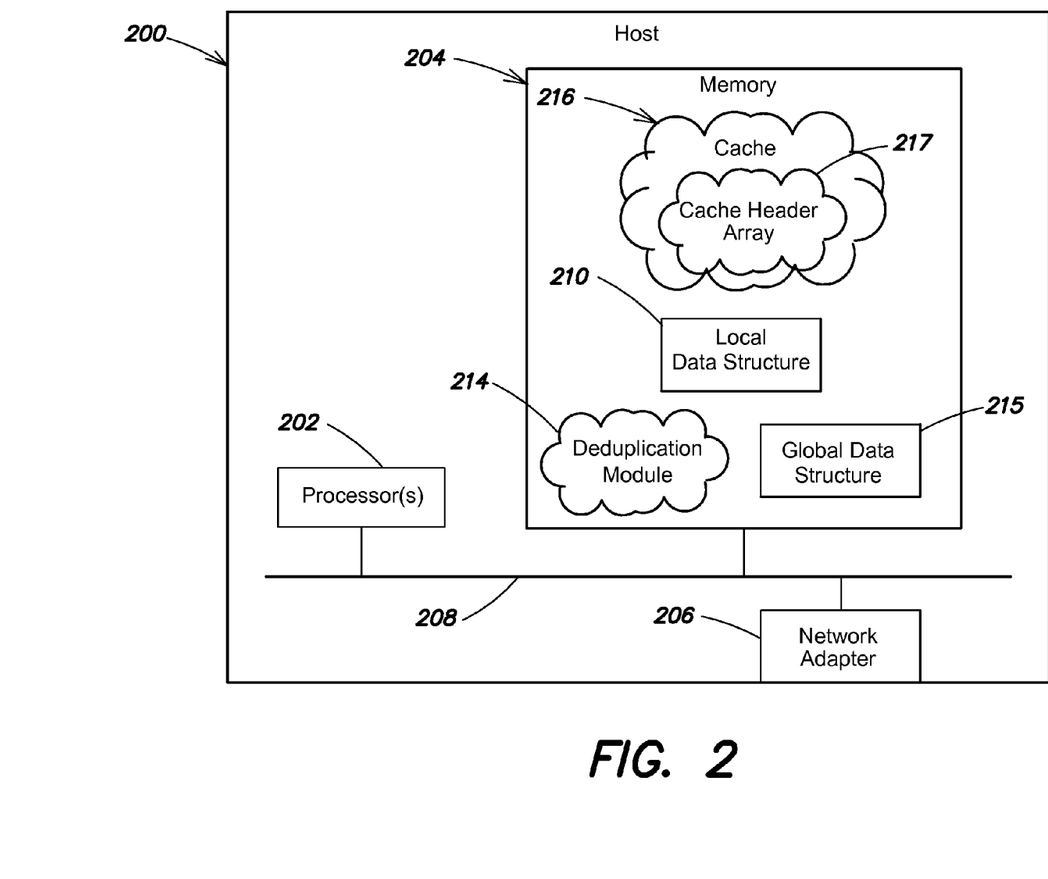
FIG. 2 is a schematic block diagram of a host system.

FIG. 2 is a block diagram of the host system 200 that may be advantageously used with the embodiments described herein. The host system 200 includes a processor 202, a memory 204, a network adapter 206 interconnected by a system bus 208. In an embodiment, the memory 204 includes memory locations that are addressable by the processor 202 and adapters for storing software programs and/or processes and data structures associated with embodiments discussed herein. The processors and adapters may include processing elements and/or logic circuitry configured to execute the software programs/processes and manipulate the data structures, such as the local data structure 210 and global data structure 212, as described below. The network adapter 206 includes the mechanical, electrical and signaling circuitry needed to connect hosts 200 over the computer network 140 such that the host systems 200 can communicate with each other over network 140, and such the host systems 200 can communicate with the storage system 120, as described below.

The memory 204 includes a cache 216 that may be either Solid State Drivers (SSDs) or hard disks. In one embodiment, a subset of the data stored on the disks 130 of the storage system 120 is preserved in the cache 216. For example, the data stored at the storage system 120 that is the most often accessed by the host 120 may be stored in the cache 216. In addition, the cache includes a cache header array 217 that includes, for example, a plurality of entries each storing a logical address associated with data stored persistently on disks 130 of the storage system 120. More specifically, the logical addresses stored in the cache header array 217 correspond to storage locations on the disks 130 where the data is stored. It is expressly contemplated that any policy or algorithm can be utilized to determine what data is stored in the cache 216. In addition, it is expressly contemplated that the cache 216 may be an external device independent of the host system 200.

In addition, the memory may include a deduplication module 214 that may generate fingerprints and perform a variety of functions associated with the embodiments described herein. For example, and as described below, the deduplication module 214 may compare the generated fingerprint with fingerprints stored in the local data structure 214 and global data structure 215 to determine if a deduplication ("dedupe") command should be constructed and sent to the storage system 120. Specifically, the deduplication module 212 generates a fingerprint of a predefined size, e.g., 64 bits, for each data block associated with data of a write request received at the host 200. Illustratively, the fingerprint may be generated using a cryptographic hash function. Alternatively, a first predetermined number of bits, e.g., the first 32 bits, of the fingerprint may be provided from the result of a checksum calculation performed by deduplication module 212, while a second predetermined number of bits, e.g., the second 32 bits, of the fingerprint may be provided from data stored at one or more predefined offsets within a data block. The resulting fingerprint sufficiently reflects the contents of the data block of the data associated with the write request to enable identification of duplicates without an undesirable rate of false positives.

Figure 3:
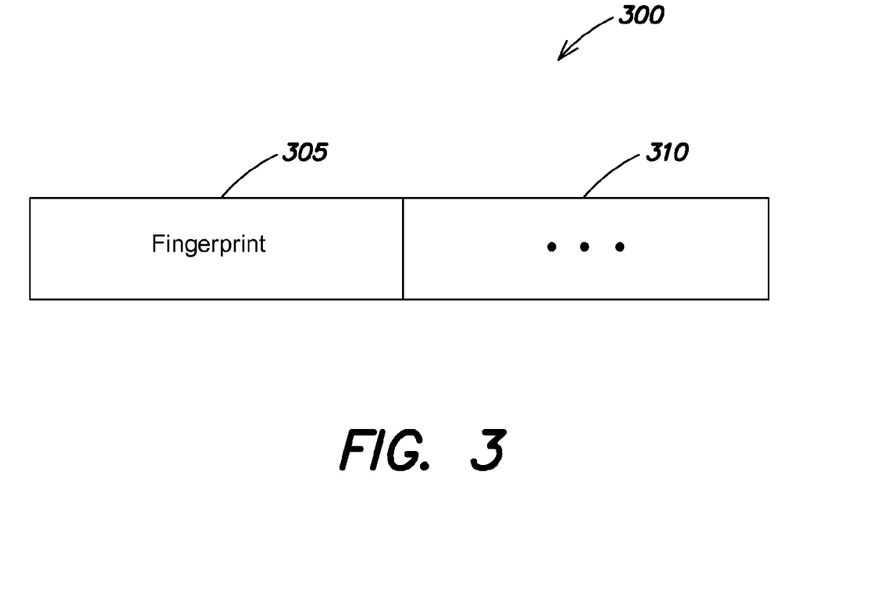
FIG. 3 is a schematic block diagram of an exemplary fingerprint.

FIG. 3 is a schematic block diagram showing elements of an exemplary fingerprint 300. The fingerprint 300 illustratively includes a fingerprint field 305 that stores, for example, a fingerprint of data associated with a write request and, in alternate embodiments, additional fields 310. A fingerprint of the data, as known by those skilled in the art, is typically a much shorter string of bits than the data itself and may be created in a variety of ways utilizing a variety of different algorithms and hashing functions (e.g., SHA-1). Specifically, the fingerprint uniquely identifies the specific data and can be utilized for data deduplication.

In an embodiment, a set of host systems 200 of a plurality of hosts computers 200 may be grouped into a zone. The host systems 200 belonging to the same zone are configured to share their fingerprints (and potentially other information) to update their respective global data structures maintained by each host system. Zones may be created utilizing any criteria, such as, but not limited to, geographical location, type of data being referenced by the hosts and stored on the storage system, etc.

Figure 4A:
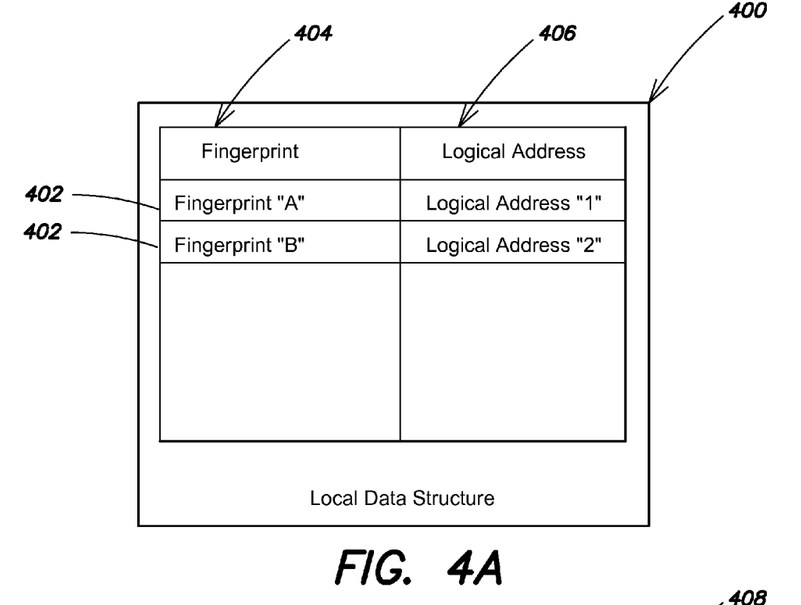
FIGS. 4A and 4B are schematic block diagrams of a local data structure.
Figure 4B:
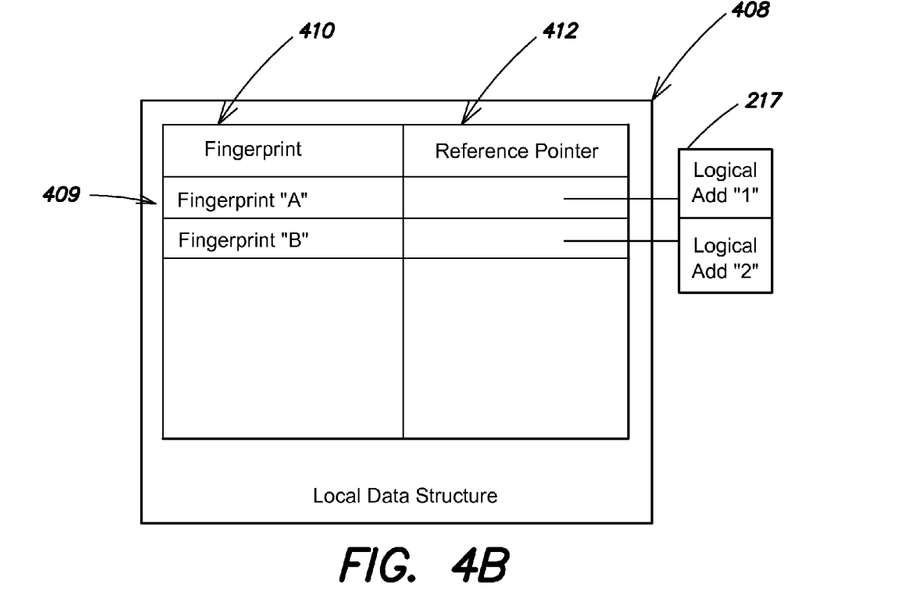

FIGS. 4A and 4B are block diagrams of a local data structure. In one embodiment, the local data structure is a local map 400 maintained by each host system 200. The local map 400 may be created using the content of the cache 216. Specifically, the deduplication module may create a fingerprint for the data stored in the cache 216 and utilize the logical addresses in the cache header array 217 to populate the local map 400. The local map 400 includes one or more entries, where each entry is a fingerprint-to-logical address mapping entry 402 that includes a fingerprint field 404 that stores the generated fingerprint and a logical address field 406 that stores the corresponding logical address, as depicted in FIG. 4A. Subsequently, and when a write request is received at the host 200 (e.g., after creating and populating the local data structure 400), the deduplication module 212 may generate a fingerprint for the data associated with the write request. When the generated fingerprint is unique (e.g., does not already exist in the local data structure 400) and the data is written/committed to a storage location on the disk 130 of the storage system 120, the storage system may transmit a logical address associated with the storage location back to the host system 200. The fingerprint and received logical address may then be stored in the fingerprint field 404 and the logical address field 406 as depicted in FIG. 4A.

In one embodiment, the local data structure is a fingerprint table 408 maintained by the host system 200 as depicted in FIG. 4B. The fingerprint table 408 includes one or more entries 409, where each entry 409 includes a fingerprint field 410 that stores the generated fingerprint and a reference pointer field 412 that stores a pointer to a particular entry in the cache header array 217 of the cache 216 that stores the logical address corresponding to the storage location of the data. The deduplication module may create a fingerprint for the data stored in the cache 216 and store the generated fingerprint in field 410. In addition, reference pointer field 412 may store a pointer to an entry in the cache header array 217 that points to the particular logical address.

It is noted that stale fingerprints may be removed from the local data structure in any number of a variety of ways, and as known by those skilled in the art. Specifically, a replacement algorithm (e.g., FIFO, CLOCK, LFU) may be utilized. Alternatively, the local data structure 400 may be compared with the cache 216 and the data in local data structure 400 that is not in the cache 216 may be removed or evicted and the local data structure 400 may be updated to be consistent with the cache 216. Specifically, the content of the cache may be hashed to re-generate fingerprints, and the re-generated fingerprints may be compared to the fingerprints maintained in the local data structure. Any fingerprints in the local data structure that do not match the re-generated fingerprints may be evicted from the local data structure. In addition, if a stale fingerprint is removed from the local data structure, the fingerprint may also be removed from the global data structures of the other host system 200 as described in further detail below.

Figures 5A, 5B, 5C:
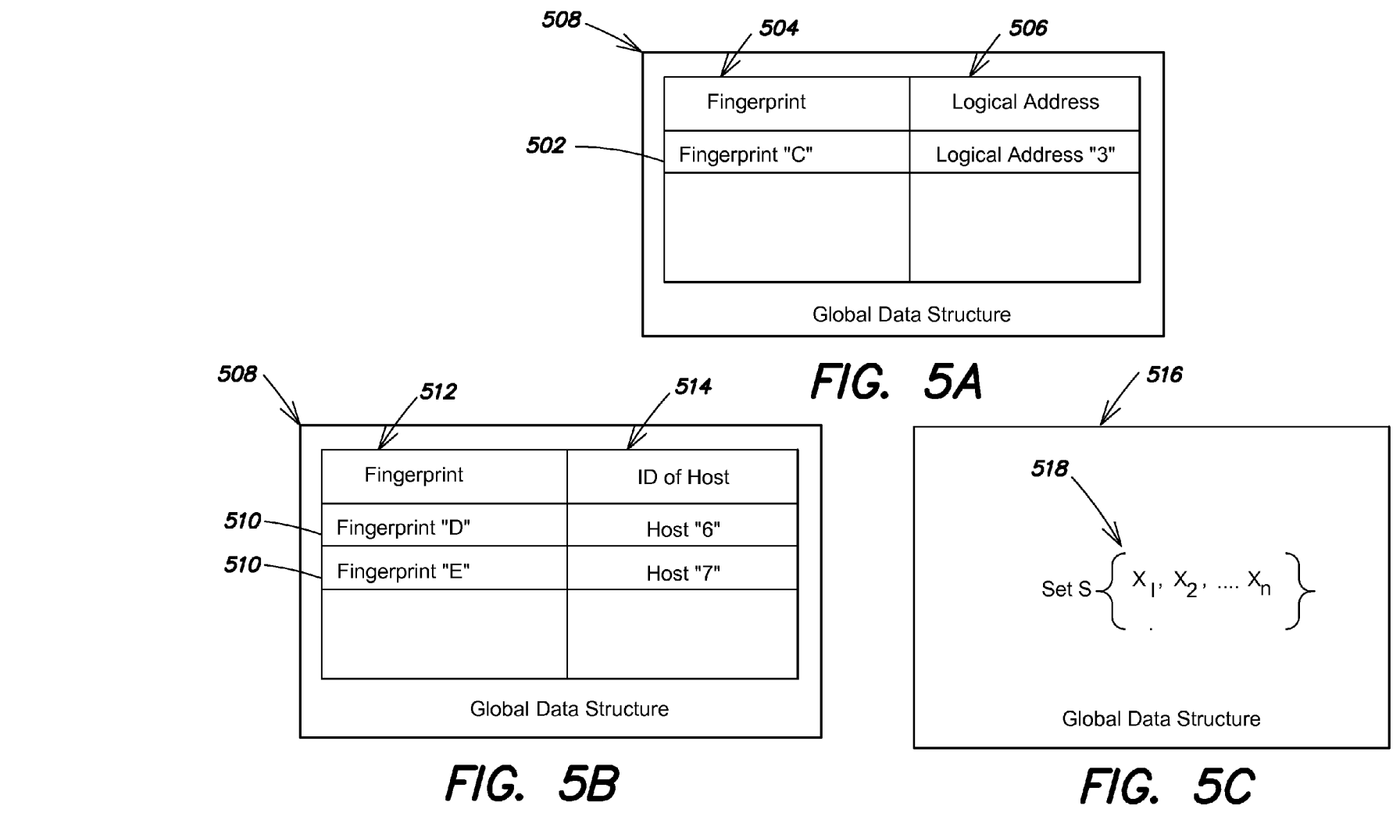
FIGS. 5A-5C are schematic block diagrams of global data structures.

FIGS. 5A-5C are block diagrams of respective global data structures. In an embodiment, the global data structure is a global logical address map 500 maintained by each host system 200 as depicted in FIG. 5A. The global logical address map 500 stores one or more fingerprint-to-logical address mapping entries 502 associated with data written to the storage system 120 by the other hosts. Specifically, the fingerprint-to-logical address mapping entry 502 includes a fingerprint field 504 that stores a received fingerprint and a logical address field 506 that stores the received corresponding logical address. That is, when a particular host system 200 generates a fingerprint for the data of the write request, and the generated fingerprint is unique (e.g., does not already exist in the local data structure 400 of the host system 200 that generated the fingerprint) the fingerprint and logical address associated with the data (after being added to the host systems 200 local data structure), may be sent over the computer network 140 to each other host. The fingerprint and logical address may be stored in the fingerprint-to-logical address mapping entry 502 of the global logical address map 500 maintained by each other host system 200.

In an embodiment, the global structure is a global identifier (ID) map 508 maintained by each host system 200 as depicted in FIG. 5B. Specifically, the global ID map 508 stores one or more fingerprint-to-host ID mapping entries 510 associated with data written to the storage system 120 by the other host systems. Each fingerprint-to-host ID mapping entry 510 includes a fingerprint field 512 that stores the received fingerprint and a ID of host field 514 storing an identifier of the host from which the fingerprint was received. The identifier of the host, for example, may be an IP address or some other identifier (e.g., username) associated with the host system 200 from which the fingerprint was received. When a particular host system 200 generates a fingerprint for the data of the write request, and the generated fingerprint is unique (e.g., does not already exist in the local data structure 400 of the host system 200 that generated the fingerprint), the fingerprint and the identifier of the host system 200 may be sent over the network 140 to each other host. The fingerprint and the identifier of the host system 200 may then be stored in the fingerprint-to-host ID mapping entry 510 of the global ID map 508 maintained by each other host system 200.

In an embodiment, the global data structure is a bloom filter 516 maintained by each host system 200, as depicted in FIG. 5C. As known by those skilled in the art, a bloom filter 516 is a space-efficient probabilistic data structure that is used to test whether an element is a member of a set. False positive matches are possible in a bloom filter, but false negatives are not, thus the bloom filter 516 has a 100% recall rate. In other words, a query to determine if a "fingerprint" is in the set of fingerprints 518 returns either "possibly in set" or "definitely not in set". When a particular host system 200 generates a fingerprint for the data of the write request, and the fingerprint is unique (e.g., does not already exist in the local data structure 400 of the host system 200 that generated the fingerprint), the fingerprint is sent over the network 140 to each other host system 200, which adds the fingerprint as a member of the set 518 of the bloom filter 516. For example, and as known by those skilled in the art, an empty bloom filter may be a bit array of m bits, all set to 0. To add an element (e.g., fingerprint) to the set, the data of the write request may be provided to a particular hash function (which is the same for all the host systems that are sharing fingerprints) to generate a fingerprint to get k array positions and the bits at those positions are then set to 1 in the bloom filter 516. Specifically, when a particular host 200 generates a fingerprint for the data of the write request utilizing the hash function, the fingerprint is sent over the network 140 to each other host that adds a member (e.g., the received fingerprint) to the set 518 by setting one or more positions within the array of the bloom filter 516.

It is noted that fingerprints (and potentially other information) may be lazily propagated to the other hosts system 200 to update their respective global data structures. For example, the updates may be propagated at regular time intervals instead of at the time the right after the local data structure is updated.

It is noted that stale fingerprints may be removed from the global data structures 500, 508, and 516 in any number of a variety of ways, and as known by those skilled in the art. Specifically, a replacement algorithm (e.g., FIFO, CLOCK, LFU) may be utilized to evict or remove stale fingerprints. In addition, certain addresses (e.g., logical addresses) can be invalidated when data is overwritten, which can lead to eviction of the corresponding fingerprint from the global data structures. Since it is desirable that updates to the global data structures due to eviction of certain fingerprints has to be consistent across all host system 200, a 2-phase commit protocol may be utilized to perform a distributed atomic transaction, which may be done before the data is written to storage system 120.

Figure 6:
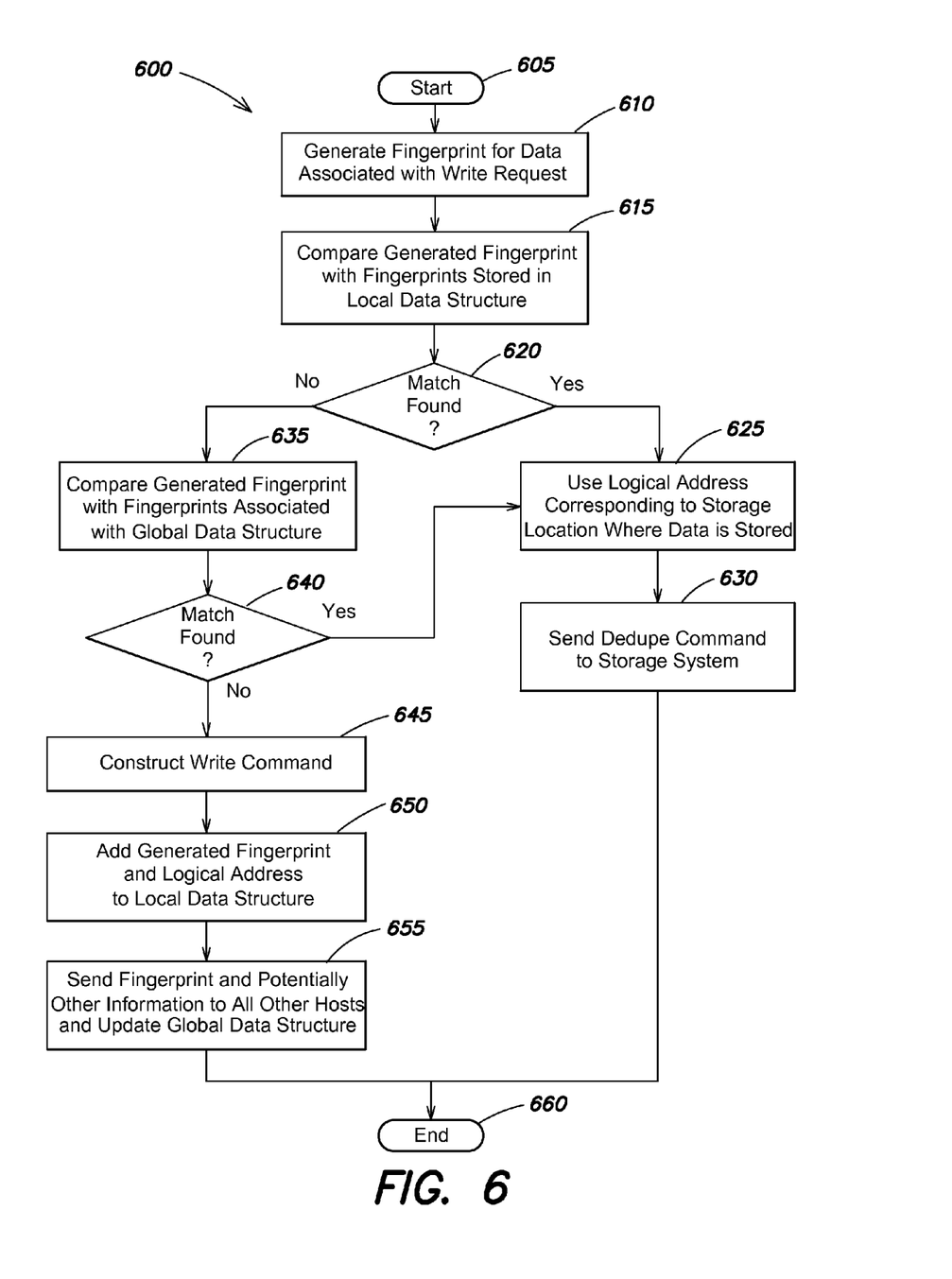
FIG. 6 is a flowchart detailing the steps of a procedure for performing peer to peer network write deduplication.

FIG. 6 is a flowchart detailing the steps of a procedure 600 for performing peer to peer network write deduplication with one or more embodiments described herein. The procedure 600 starts at step 605 and continues to step 610, where a fingerprint is generated for data associated with a write request received at host system 200. Specifically, the deduplication module 214 generates a fingerprint of the data associated with the write request. At step 615, the generated fingerprint is compared with the one or more fingerprints stored in the local data structure 400.

If the local data structure is local map 400, the deduplication module 214 compares the generated fingerprint with the fingerprints stored in fingerprint field 404 of the fingerprint-to-logical address mapping entries 402. For example, the deduplication module 214 compares each bit of the generated fingerprint with each bit of the fingerprints stored in the fingerprint field 404 of the entries 402. If the local data structure is fingerprint map 408, the deduplication module 215 compares each bit of the generated fingerprint with each bit of the fingerprints stored in fingerprint field 410 of the entries 409. At step 620, it is determined whether a match exists between the generated fingerprint and the fingerprints stored in the local data structure. Specifically, the deduplication module 214 determines if the match exists based on the comparison as described above. A match (e.g., that the generated fingerprint is not unique) indicates that the data associated with the write request and is stored on the disks 130 of the storage system 120.

If, at step 620 a match exists between the generated fingerprint and a fingerprint in the local data structure 400, the procedure branches to step 625 where the logical address corresponding to the storage location where the data is stored is utilized to construct a dedupe command. Specifically, if the local data structure is local map 400 and the generated fingerprint matches a fingerprint stored in fingerprint field 404 of a particular fingerprint-to-logical address mapping entry 402, the logical address stored in logical address field 406 is utilized to construct the dedupe command. For example, and referring to FIG. 4A, if the generated fingerprint matches fingerprint "A" stored in fingerprint field 404, then the deduplication module constructs the dedupe command utilizing the logical address "1" stored in logical address field 406. If the local data structure is fingerprint map 408 as depicted in FIG. 4B, and the generated fingerprint matches a fingerprint stored in fingerprint field 410 of a particular entry 409, the logical address referenced by the pointer of the reference pointer field 412 of the same entry 409 and stored in a particular entry of cache header array 217 is utilized to construct the dedupe command.

At step 630, the dedupe command is transmitted to the storage system over the computer network 104. Specifically, dedupe command may instruct, for example, the storage system to increment a reference count associated with the data stored at the logical address of the storage system. For example, the dedupe command may be directed to a particular ISCSI target and may include an ISCIS target ID, a LUN ID, a logical block address, and an offset. Alternatively, the dedupe command may instruct the storage system to copy the data from the source location to a destination location associated with the logical address. As known by those skilled in the art, the dedupe command may be implemented through a SCIS EXTENDED XCOPY command and/or a NFS Server-Side copy, where the host system 200 may issue a COPY command (excluding the data associated with the write request) to the storage system 120. Advantageously, network bandwidth is saved since the dedupe command sent over the network 140 does not include the data associated with the write request and only includes the command that instructs the storage system 120 to increase the reference count or copy the data and store the copy of the data.

If at step 620 a match does not exist between the generated fingerprint and a fingerprint in the local data structure 400, the procedure branches to step 635 where the generated fingerprint is compared to the fingerprints associated with the global data structure maintained by the host system 200. For example, the deduplication module 214 compares each bit of the generated fingerprint with each bit of the fingerprints stored in the global data structure maintained by the host system 200. It is noted that the global data structure may be the global logical address map 500, the global ID map 508, or the bloom filter 516.

If at step 640 a match exists between the generated fingerprint and a fingerprint associated with the global data structure, the procedure branches to step 625 where the logical address corresponding to the storage location where the data is stored is utilized to construct a dedupe command. Specifically, if the global data structure is the global logical address map 500 then the logical address stored in the logical address field 506 is utilized to construct the dedupe command. For example, and with reference to FIG. 5A, if the generated fingerprint matches fingerprint "C" stored in fingerprint field 504, then the deduplication module constructs the dedupe command utilizing the logical address "3" stored in logical address field 506.

If the global data structure is the global ID map 508 and the generated fingerprint matches fingerprint "D" stored in the fingerprint field 512, the host identifier, e.g., host "6" stored in ID of the host field 514 is utilized to identify the host that stores the matching fingerprint in its corresponding the local data structure 400. As such, the deduplication module 214 may send one or more commands to the host, e.g., corresponding to host "6", storing the matching fingerprint in its local data structure. Once the host system 200, e.g., host "6", receives the one or more commands, the host, e.g., host "6", may query its local data structure to identify the matching fingerprint. For example, if the host system 200 maintains local map 400, the matching fingerprint is stored in the fingerprint field 404 of a particular fingerprint-to-logical address mapping entry 402, and the logical address stored in the logical address field 406 of the same entry 402 is obtained to be sent to the host system 200. If the host system 200 maintains fingerprint table 408, the matching fingerprint is stored in fingerprint field 410 of an entry 409, and the corresponding pointer in reference pointer field 412 is utilized to obtain the logical address from the header array 217 that is sent to the host system 200.

It is noted that if the generated fingerprint matches more than one fingerprint stored in the global ID map 508, a particular host system may be selected to obtain the logical address. For example, the particular host system may be selected based on that host system being the closest to the host system that generated the fingerprint (e.g., hosts with the same rack are closer than hosts in different racks). Information relating to the distance between hosts may be maintained in a configuration file (not shown) at each host system 200.

If the global data structure is a bloom filter 516 and the generated fingerprint is determined to be a member of the set 518, the deduplication module 214 sends a command to each other host to have each other host determine if a fingerprint maintained in the local data structure at each other host matches the generated fingerprint. If the match is found, the logical address, at a different host and associated with the matching fingerprint, is transmitted back to the deduplication module 214 of the host system 200.

The procedure then continues to step 630 and the logical address obtained, based on a match between the generated fingerprint and a fingerprint in global data structure, is utilized to generate the dedupe command.

If at step 640 a match does not exist between the generated fingerprint and a fingerprint associated with the global data structure, the procedure branches to step 645 where a write command is constructed for the data associated with the write request. The write command may be queued in a buffer and may then be transmitted to the storage system 120 to store the data associated with the write request on a storage location on the disks 130 of the storage system 120, wherein the storage location has a corresponding logical address. The logical address may then be sent from the storage system 120 to the host system 200 that generated the fingerprint. At step 650, the generated fingerprint and the received logical address is stored in the local data structure. For example, if the local data structure is local map 400, the deduplication module 214 may store the fingerprint and the received logical address in fields 404 and 406 of the new entry 402 in the local map 400. If the local data structure is fingerprint table 408, the data associated with the write request may be stored in cache 216, the fingerprint may be stored in fingerprint field 410, and a pointer in reference pointer field 412 may point to the logical address stored in an entry of the cache header array 217.

At step 655, the fingerprint and potentially other information are sent to all other host systems 200 to update the global data structures maintained by each other host. For example, if the global data structure is the global logical address map 500, then the generated fingerprint and logical address are sent to the other hosts and stored in fields 504 and 506 as a new entry 502. If the global data structure is the global ID map 508, then the generated fingerprint and identification information associated with the host is sent to the other hosts and stored in fields 512 and 514 of new entry 510. If the global data structure is bloom the filter 516, then the generated fingerprint is sent to the other hosts and added as a member of the set 518 of the bloom filter 516. It is noted that if one or more zones are created, the host systems 200 in the same zone exchange the fingerprints and the potentially other information. At step 660, the procedure ends.

The foregoing description has been directed to specific subject matter. It will be apparent, however, that other variations and modifications may be made to the described subject matter, with the attainment of some or all of its advantages. It is expressly contemplated that the procedures, processes, and methods described herein may be implemented in alternative orders. Accordingly this description is to be taken only by way of example and not to otherwise limit the scope of the subject matter described herein. Therefore, it is the object of the appended claims to cover all such variations and modifications as come within the true spirit and scope of the subject matter.

What is claimed is:

1. A host system comprising:
    a processor; and
    a memory coupled to the processor and configured to store one or more processes, the one or more processes when executed by the processor configured to:
        generate a fingerprint of data associated with a write request, wherein the data is destined for storage on a storage system coupled to the host system over a computer network;
        determine whether the generated fingerprint matches a local fingerprint stored in a local data structure maintained at the host system or whether the generated fingerprint matches a global fingerprint stored in a global data structure maintained at the host system, wherein the local fingerprint is associated with first data previously written to the storage system by the host system and wherein the global fingerprint is associated with second data previously written to the storage system by a different host system;
        construct a first deduplication command utilizing a first logical address corresponding to a first storage location where the first data is stored based on the generated fingerprint matching the local fingerprint;

construct a second deduplication command utilizing a second logical address corresponding to a second storage location where the second data is stored based on the generated fingerprint matching the global fingerprint; and construct a write command for the data of the write request based on the generated fingerprint not matching the local fingerprint and the global fingerprint.

2. The host system of claim 1, wherein global data structure includes a global entry storing the global fingerprint and the second logical address.

3. The host system of claim 1, wherein the global data structure includes a global entry storing the global fingerprint and an identifier identifying the different host system that stores the global fingerprint.

4. The host system of claim 3, wherein the one or more processes are further configured to receive the second logical address over the network from the different host system, wherein the different host system maintains a different host local data structure including a different entry that stores the global fingerprint and the second logical address.

5. The host system of claim 1, wherein the global data structure is a bloom filter including a set and wherein the one or more processes are further configured to determine that the generated fingerprint matches the global fingerprint maintained in the global data structure when the generated fingerprint is within the set.

6. The host system of claim 5, wherein the one or more processes are further configured to send a command, to all of a plurality of different host systems, to query a different local data structure, maintained at each of the plurality of different host systems, for a global identifier when the generated fingerprint is within the set.

7. The host system of claim 1, wherein the one or more processes are further configured to store the generated fingerprint and a new logical address in a new entry of the local data structure when the generated fingerprint does not match the local fingerprint and the global fingerprint.

8. A method comprising:

generating, by a processor of a host system, a fingerprint of data associated with a write request, wherein the data is destined for storage on a storage system coupled to the host system over a computer network;

determining whether the generated fingerprint matches a local fingerprint stored in a local data structure maintained at the host system or whether the generated fingerprint matches a global fingerprint stored in a global data structure maintained at the host system, wherein the local fingerprint is associated with first data previously written to the storage system by the host system and wherein the global fingerprint is associated with second data previously written to the storage system by a different host system;

constructing a first deduplication command utilizing a first logical address corresponding to a first storage location where the first data is stored;

constructing a second deduplication command utilizing a second logical address corresponding to a second storage location where the second data is stored; and constructing a write command for the data of the write request based on the generated fingerprint not matching the local fingerprint and the global fingerprint.

9. The method of claim 8, further comprising storing the global fingerprint and the second logical address in a global entry of the global data structure.

10. The method of claim 8, further comprising storing the global fingerprint and an identifier in a global entry of the global data structure, the identifier identifying the different host system that stores the global fingerprint.

11. The method of claim 10, further comprising receiving the second logical address over the network from the different host system, wherein the different host system maintains a different host local data structure including a different entry that stores the global fingerprint and the second logical address.

12. The method of claim 8, wherein the global data structure is a bloom filter and further comprising determining that the generated fingerprint matches the global fingerprint maintained in the global data structure when the generated fingerprint is within the set.

13. The method of claim 12, further comprising sending a command, to all of a plurality of different host systems, to query a different local data structure, maintained at each of the plurality of different host systems, for a global identifier when the generated fingerprint is within the set.

14. The method of claim 8 further comprising storing the generated fingerprint and a new logical address in a new entry of the local data structure when the generated fingerprint does not match the local fingerprint and the global fingerprint.

15. A non-transitory computer readable storage medium containing program instructions configured for execution by a processor and further configured to be stored on the computer readable storage medium, the program instructions configured to:

generate a fingerprint of data associated with a write request, wherein the data is to be written to a storage system coupled to a host system over a computer network;

determine whether the generated fingerprint matches a local fingerprint stored in a local data structure maintained at the host system or whether the generated fingerprint matches a global fingerprint stored in a global data structure maintained at the host system, wherein the local fingerprint is associated with first data previously written to the storage system by the host system and wherein the global fingerprint is associated with second data previously written to the storage system by a different host system;

construct a first dedupe command utilizing a first logical address corresponding to a first storage location where the first data is stored based on the generated fingerprint matching the local fingerprint;

construct a second dedupe command utilizing a second logical address corresponding to a second storage location where the second data is stored based on the generated fingerprint matching the global fingerprint; and construct a write command for the data of the write request based on the generated fingerprint not matching the local fingerprint and the global fingerprint.

16. The non-transitory computer readable storage medium of claim 15, wherein the global data structure includes a global entry storing the global fingerprint and the second logical address.

17. The non-transitory computer readable storage medium of claim 15, wherein the global data structure includes a global entry storing the global fingerprint and an identifier identifying the different host system that stores the global fingerprint.

18. The non-transitory computer readable storage medium of claim 17, wherein the program instructions are further configured to receive the second logical address over the network from the different host system, wherein the different host system maintains a different host local data structure including a different entry that stores the global fingerprint and the second logical address.

19. The non-transitory computer readable storage medium of claim 15, wherein the global data structure is a bloom filter including a set and where the program instructions are further configured to determine that the generated fingerprint matches the global fingerprint maintained in the global data structure when the generated fingerprint within the set of the bloom filter.

20. The non-transitory computer readable storage medium of claim 19, wherein the program instructions are further configured to send a command, to all of a plurality of different host systems, to query a different local data structure, maintained at each of the plurality of different host systems, for a global identifier when the generated fingerprint is within the set.

* * * * *